United States Patent [19]

Schweikl et al.

[11] Patent Number: 4,545,791
[45] Date of Patent: Oct. 8, 1985

[54] VENTED LIQUID RESERVOIR

[75] Inventors: Ludwig Schweikl, Moosburg; Olaf Krauss, Karlsfeld, both of Fed. Rep. of Germany

[73] Assignee: MTU Motoren-Und-Turbinen Union Munchen GmbH, Munich, Fed. Rep. of Germany

[21] Appl. No.: 648,651

[22] Filed: Sep. 7, 1984

Related U.S. Application Data

[63] Continuation of Ser. No. 331,441, Dec. 16, 1981, abandoned.

[30] Foreign Application Priority Data

Dec. 18, 1980 [DE] Fed. Rep. of Germany ....... 3047719

[51] Int. Cl.⁴ .................. B01D 19/00; F16K 17/36
[52] U.S. Cl. ........................ 55/182; 55/204; 137/43; 137/45
[58] Field of Search ................. 55/182–184, 55/190, 201–205; 137/43, 45

[56] References Cited

U.S. PATENT DOCUMENTS

| | | | |
|---|---|---|---|
| 2,364,119 | 12/1944 | Anderson | 55/182 |
| 2,983,331 | 5/1961 | Helsley, Jr. | 55/182 X |
| 3,130,022 | 4/1964 | Clark | 55/182 |
| 3,397,512 | 8/1968 | Webb | 55/204 |
| 3,715,863 | 2/1973 | Zanoni | 55/204 |
| 3,771,287 | 11/1973 | Sunderland | 55/201 X |
| 3,942,961 | 3/1976 | Holliday et al. | 55/203 |
| 3,982,399 | 9/1976 | Rookey | 55/182 X |
| 4,053,291 | 10/1977 | Sims | 55/182 X |
| 4,093,428 | 6/1978 | Swogger | 55/182 X |
| 4,197,870 | 4/1980 | Hildebrandt et al. | 137/45 X |

Primary Examiner—Robert Spitzer
Attorney, Agent, or Firm—Alan H. Levine

[57] ABSTRACT

A liquid reservoir, such as an oil tank, for use in missiles or aircraft which are subjected to extreme flight attitudes. The reservoir has a wall rotationally symmetrical about the longitudinal axis of the reservoir, and the liquid content of the reservoir is rotated about the longitudinal axis to provide, by centrifugal force, a central space within the reservoir which is essentially free of liquid. Air is vented from the reservoir through a fixed vent located within the central space created when the liquid content is rotated.

22 Claims, 6 Drawing Figures

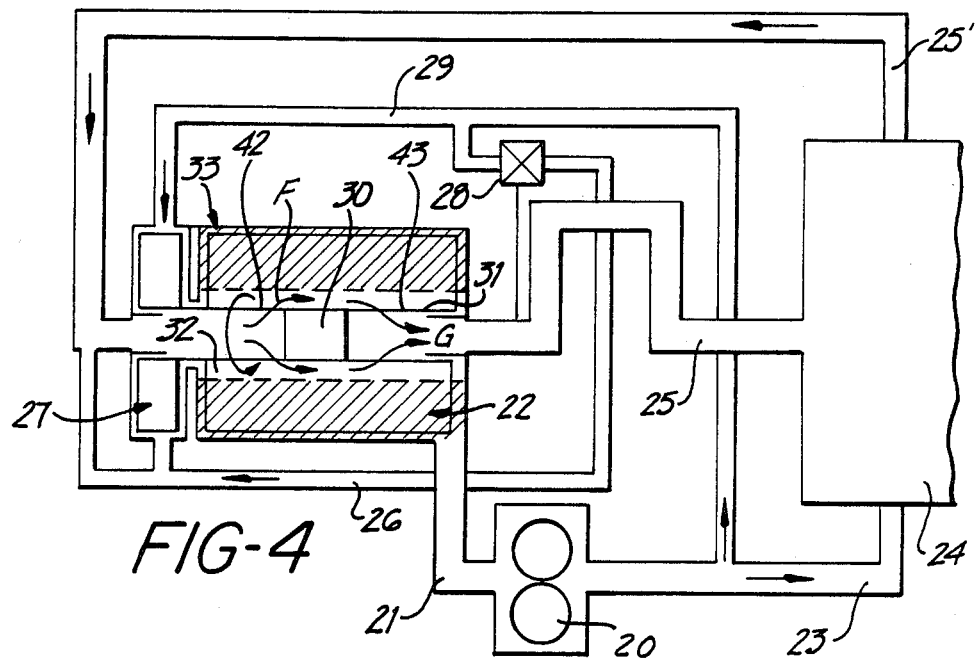
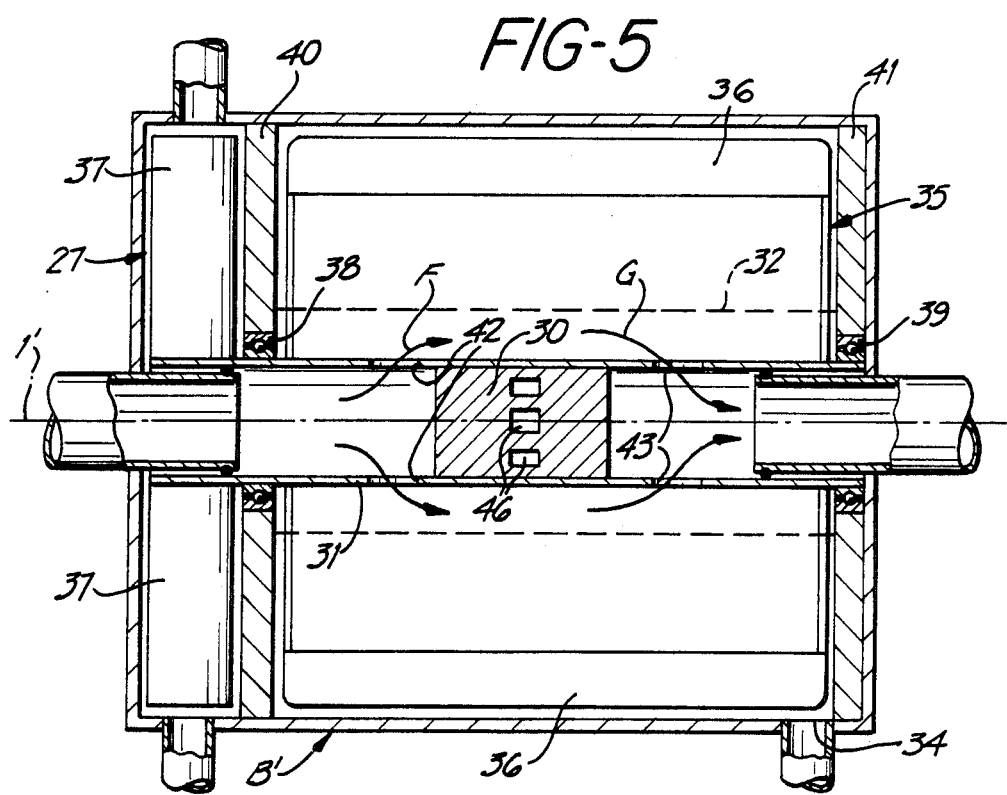

VENTED LIQUID RESERVOIR

This application is a continuation of application Ser. No. 331,441, filed Dec. 16, 1981, now abandoned.

The present invention relates to a liquid reservoir, more particularly an oil tank, having means for reservoir venting, consideration being paid to extreme flight attitudes and conditions of missiles or aircraft, such as airplanes.

Conventional approaches face considerable difficulty in providing a liquid reservoir, such as an oil tank, which ensures reliable oil supply and venting of the tank during extreme flight conditions, for example in dives, vertical climbs, inverted flight and flight conditions around or below zero g. Known solutions to this problem employ, e.g., designs utilizing gravity-controlled pendulums, valve systems, and flexible snorkels, in connection with systematically distributed vent ducts to alternately serve the venting function at various flight attitudes.

German Patent Specification DE-AS 2,743,944 or in U.S. Pat. No. 4,197,870 discloses means for venting liquid reservoirs subject to hazardous pressure rises in aircraft applications. Vent pipes are arranged inside the liquid reservoir such that in all conditions the opening of at least one vent pipe remains above the level of the liquid, and the opening of at least one other vent pipe remains below the liquid level, the respective other ends of the vent pipes opening into separate chambers sealed from the interior of the tank. The chambers are associated with a rotary valve controlled by a weight positioned by the forces of gravity as a function of flight attitude, and control slots of this valve are spaced such that at free flow through the one vent pipe above the level of liquid, flow through the other vent pipe below the liquid level is prevented.

All of said known solutions are encumbered by a disadvantage in that they are mechanically complex and trouble-ridden, and that under flight conditions such as those mentioned above, especially under zero-g conditions, they cannot safely ensure adequate oil supply.

In a broad aspect, the present invention eliminates the disadvantages of known solutions and employs a mechanically simple configuration to ensure reliable operation, special consideration being paid to extreme flight attitudes or conditions around or even below zero g.

It is a particular object of the present invention to provide a liquid reservoir wherein the liquid is rotated to create, by centrifugal force, a substantially liquid-free central space from which the reservoir can be vented.

In accordance with the present invention, the liquid content in a rotationally symmetrical liquid reservoir, such as an oil tank, is caused to rotate such that even in level flight an oil-free core is formed in the interior of the tank as a point from which the tank can be vented. Under positive and negative g loads this core assumes an eccentric position, while at zero g it occupies the absolute center of the oil tank. In climb and dive attitudes, the core takes the form of a parabola. Form, position, and size of the core are a function of g loads imposed on the tank content, of the flight attitude, and of the angular velocity of the tank content. Under service conditions of engines exposed to extreme flight attitudes, therefore, the principle underlying the present invention permits oil tanks to be designed so that it is always possible to vent the tank from the core area of the tank using a static element. For best results, the oil is extracted centrally with regard to the length of tank. In order to ensure safe extraction at low tank levels, the present invention gives the rotationally symmetrical outer wall of the tank a conical shape flared in the direction of the oil extraction point.

In order to cause the liquid reservoir content to rotate, the present invention exploits the energy contained in the liquid flowing into the tank, such as the oil-air mixture from the engine. Such returning oil can be ducted into the tank through tangentially arranged nozzles imparting the impulse required to produce the angular motion.

In another embodiment of the present invention, a rotatably mounted barrel or a rotatably mounted bladed element is provided in the tank to cause, under external power, the oil content to rotate.

In a further aspect of the present invention, filling of the tank at standstill to a point above the vent extraction point is made possible by arranging the vent duct such that at standstill it rises vertically above the oil level. This prevents the tank from being drained through the vent duct.

In a further aspect of the present invention, the filling of the tank to a point above the central venting point is achieved by using the pressure filling provisions normally practiced with engines, and arranging a port of relatively small diameter in the outer tank end wall area, where it communicates with the vent line. During the filling process the oil level can then rise as high as that port. In operation, i.e., when the tank content is rotating, oil will enter the vent duct through that port. This amount of leakage is considered negligible compared with the amount of oil circulating in the oil system of a turbojet engine.

Further objects and advantages of the present invention will become apparent from the following detailed description in which reference is made to the accompanying drawings. In the drawings:

FIG. 4 is a schematic arrangement of the oil circuit including an engine gearbox and a further oil tank variant using an impeller-type pump to rotate the bladed wheel in the tank;

FIG. 5 is a longitudinal cross-sectional view illustrating a further oil tank embodiment shown in combination with an impeller-type pump to drive a bladed wheel arranged in the tank.

Figure 1:
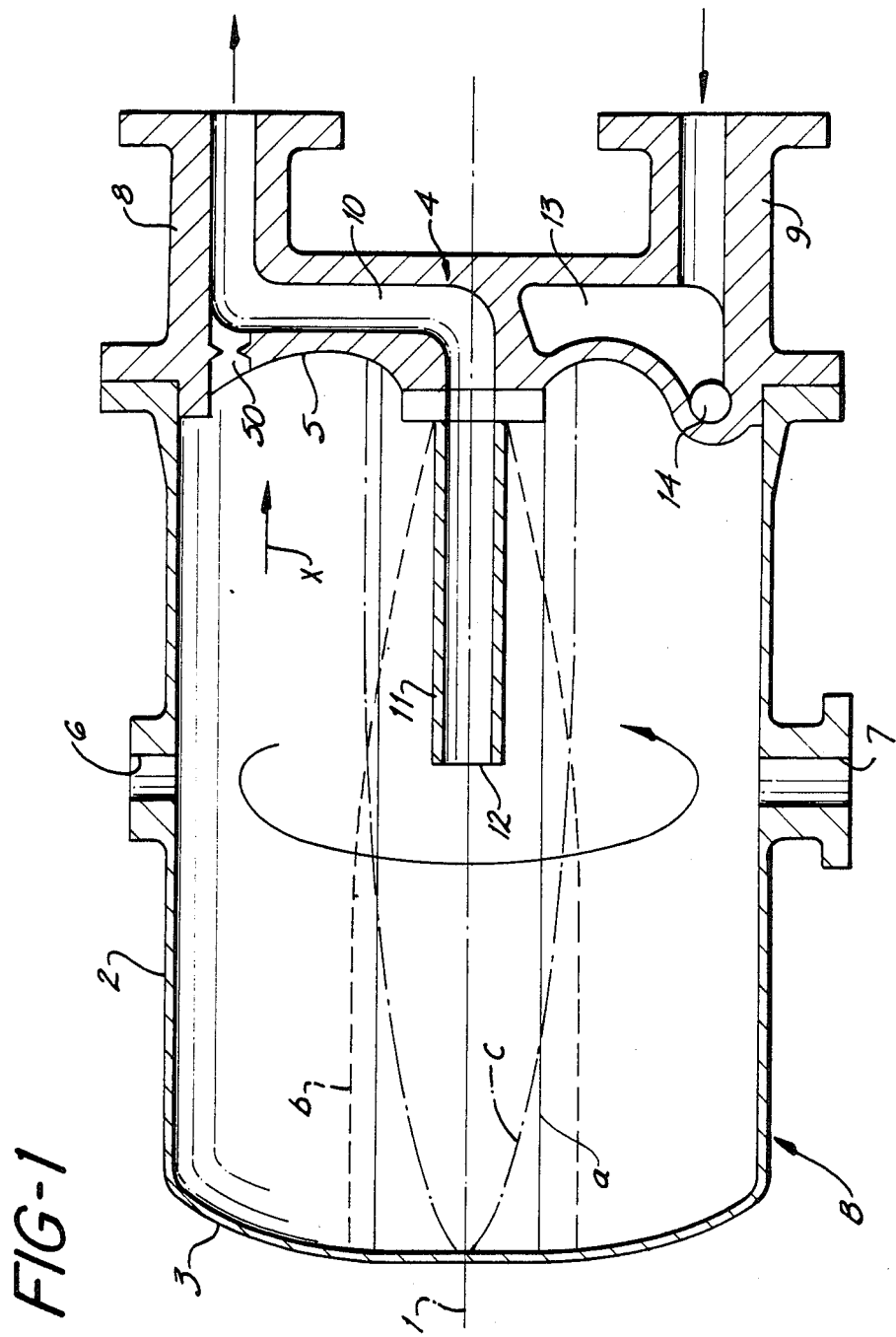
FIG. 1 is a longitudinal cross-sectional view illustrating a first embodiment of an oil tank, wherein the tank content is caused to rotate under the action of oil returning into the tank through nozzles.

The oil tank (reservoir B) shown in FIG. 1 comprises an outer wall 2 rotationally symmetrical about the longitudinal centerline 1 of the tank. An end wall 3 of the tank is shown at the left-hand side of the drawing, and a carrier 4, shown on the right-hand side of the drawing, forms the bottom 5 of the tank opposite end wall 3. Provided in the rotationally symmetrical outer wall 2 of the tank is an oil filler port 6, centrally located relative to the longitudinal direction of the tank. Also provided on the outer wall 2 of the tank, on the side opposite the oil filler port 6, is a connector and oil extraction port 7.

The carrier 4 shown on the right-hand side of the drawing in FIG. 1 has line connectors 8 and 9, line connector 8 accommodating a vent line 10 recessed into the carrier 4. Vent line 10 is extended in the direction of the tank center line in the form of a centrally arranged vent line 11, and terminates in an air extraction port 12. It is essential to the proper function of the present invention that with the tank content at a standstill and vent line 11 extending vertically, extraction port 12 should invariably remain above the level of liquid in the tank when at rest.

Line connector 9 communicates with a space 13 arranged in the carrier 4 and energized with returning oil such that at least one nozzle 14 recessed into the carrier 4 or bottom 5 of the tank in the area of the outer circumferential wall feeds the oil into the tank under impulse action and so causes the oil content in the interior of the tank to rotate. Rotation of the tank content causes a moderately eccentrically arranged air core "a" to form in the tank as a function of the prevailing flight attitude and the forces of acceleration acting on the tank content. The core can take the shape of a parabola as shown by dash line "b", the parabola having a rotationally symmetrical convergent form when viewed from its open side, i.e., from tank end 3 toward the opposite tank bottom 5. Another parabolic form of the air core is illustrated by dot-dash line "c", the parabolic structure of this air core being such that the parabola is open when viewed from the tank bottom 5, while it is rotationally symmetrically convergent and parabolic towards the opposite end 3 of the tank.

Figure 2:
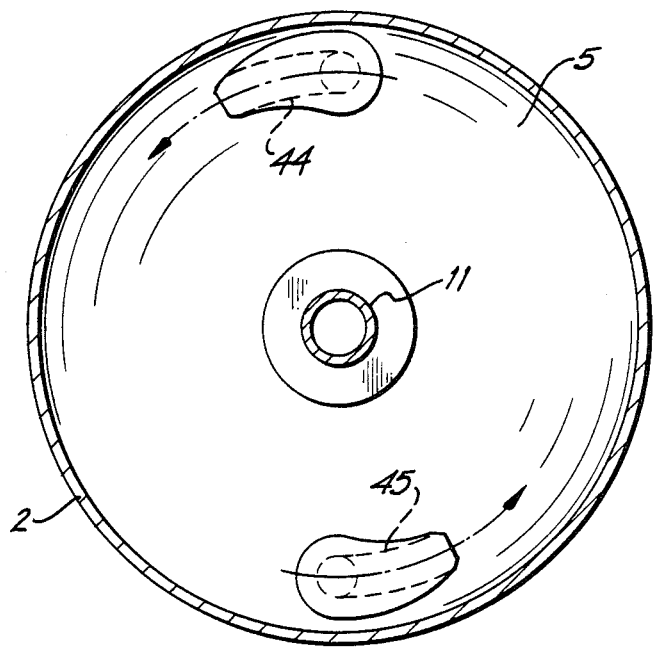
FIG. 2 is a view looking in the direction of arrow X in FIG. 1, illustrating a more practical embodiment of an oil tank as regards the arrangement of nozzles.

According to a variant of the invention shown in FIG. 2, which is more appropriate regarding practical requirements, two nozzles 44 and 45 for the oil supply, used instead of single nozzle 14, are spaced 180° apart in the outer circumferential wall area of the tank bottom 5.

In a further aspect of the present invention, the various nozzles may be equally spaced apart on the inner circumferential wall of the tank, or a combined arrangement is used where the nozzles are arranged on both the tank bottom and on the concentric circumferential wall. It will also be possible, although this is not shown on the drawings, to arrange the various nozzles such that they penetrate the circumferential wall of the tank from the outside to the inside.

Figure 3:
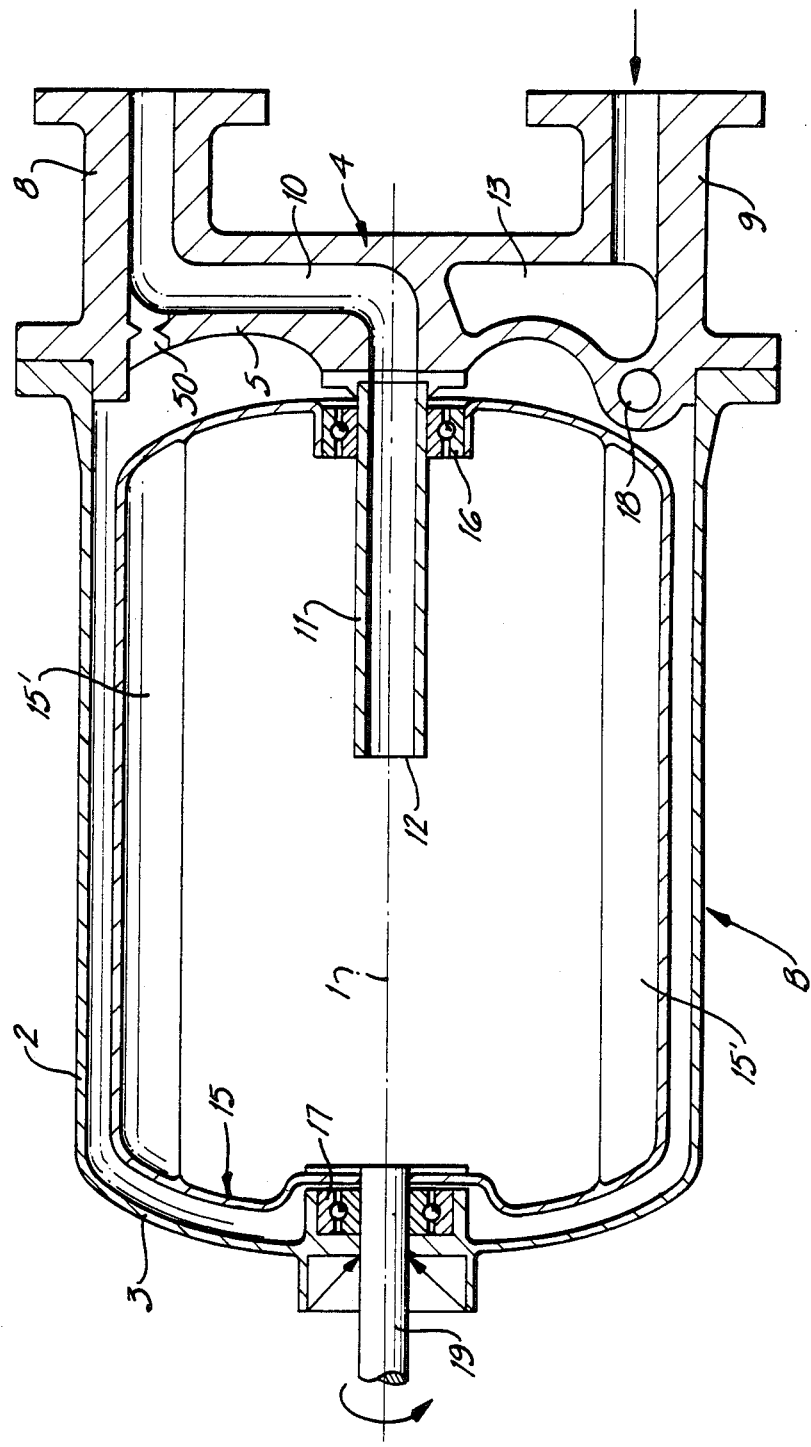
FIG. 3 is a longitudinal cross-sectional view illustrating another embodiment of an oil tank wherein rotation of the oil content is produced by means of an externally driven impeller.

Using essentially the same reference numerals for the same components as FIG. 1, FIG. 3 illustrates a further tank embodiment. In this case, a barrel-shaped bladed wheel 15 is arranged within the tank or reservoir B for rotation about its longitudinal centerline 1, the wheel having blades extending in the longitudinal direction of the tank. The bladed wheel 15 is rotatably carried by a ball bearing 16 on the vent line 11, and it is rotatably carried on the opposite side by another ball bearing 17 on the wall 3 of the tank. In this embodiment, rotation of bladed wheel 15 rotates the oil content of the tank such that air cores are formed having the configuration indicated by "a", "b", and "c" in FIG. 1. From these air cores, the tank can be vented to the atmosphere through a vent line extending axially centrally into the cores. The line connector 8 in FIGS. 1 and 3 can be connected through a suitable line to a gearbox of a gas turbine engine, the gearbox being omitted in the drawing, and being in turn vented to the atmosphere in some conventional manner. In the case of FIG. 3, therefore, no nozzles are required to force the oil in the tank to rotate, so that the space 13 in the carrier 4 communicates with the interior of the tank only through a suitable oil supply port 18.

Rotation of the bladed wheel 15 of FIG. 3 can be caused by any desired type of external power. This may be an impeller-type pump coupled to the shaft trunnion 19, or it may be a small turbine powered by means of air or gas bled from a turbojet engine. The respective type of external power will readily permit utilization additionally of the energies of flow arising in the respective oil circulating systems to assist the external source of power.

Provided in accordance with the system diagram of FIG. 4 is an oil feed pump 20 drawing oil from the oil tank 22 through a line 21. The oil feed pump then delivers the oil into the gearbox 24 of a jet engine through an oil feed line 23.

The oil needed to power the impeller-type pump 27 is diverted from the oil feed line 23 through a line 29, a regulating valve 28 serving to limit the pressure difference across the impeller-type pump 27 and to discharge excess oil, through line 26, into line 25'. The oil-air mixture drawn from the gearbox 24 is returned through line 25', to the oil tank 22 after having passed through a cooler which was omitted in the drawing.

In a further aspect of the present invention, the regulating valve 28 and the line 26 are omitted and the oil flow to the impeller-type pump is instead limited by means of a restrictor in the line 29. A vent line 25 serves to vent the oil tank 22 to the gearbox 24, which in turn is vented to the atmosphere in some conventional manner. The vent line 25 is routed such that it rises vertically above the oil level when at a standstill.

As will also be apparent from FIG. 4, the impeller-type pump 27 and the bladed wheel 33 are arranged on a common rotor 31, the internally hollow rotor 31 being carried centrally in the area of the lateral tank walls and for rotation circumferentially. A barrier 30 is provided in the central rotor area. Axially before and behind the barrier 30 are slot-shaped, circumferentially equally spaced ports 42 and 43, respectively, in the rotor wall. The blades extend longitudinally to the vicinity of the lateral tank confinement walls and from the outer side of the rotor to the vicinity of the adjacent rotationally symmetrical inner wall of the tank.

In operation, when the oil in the tank is rotating, the oil-air mixture from line 25' flows into the interior of the rotor and, through the ports 42 upstream of the barrier 30, into the centrally positioned air core 32 in the direction of arrowhead F. Forced deflection caused when the mixture negotiates the barrier 30 separates the oil from the air, so that air flows into the interior of the rotor, in the direction of arrowhead G, through the ports 43 downstream of the barrier 30 and then into the vent line 25.

Using the same reference numerals for essentially unchanged components of FIG. 4, FIG. 5 illustrates a more closely designed externally driven bladed wheel arrangement in the oil tank or reservoir B': In the case of FIG. 5, the rotating element has the shape of a barrel-shaped rotor 35 having circumferentially equally spaced blades 36. The barrel-shaped rotor 35 is optionally welded to the centrally supported rotor shaft 31. Also arranged on the rotor shaft 31 are the vanes 37 of the impeller-type pump 27. The rotor shaft 31 is rotatably carried by ball bearings 38 and 39 on radial wall sections 40 and 47 within the tank.

In lieu of ball bearings 38 and 39, plain bearings can be used. In operation the reservoir B' is vented exactly as described with reference to FIG. 4. In order to ensure safe oil supply at low oil levels in the tank, it may be advantageous to conically expand the tank wall in the area of extraction port 34.

Returning to FIGS. 1 and 3, it may be added that an air extraction port 50, in the form of a restrictor arranged in carrier 4 of the oil tank, and more precisely in the vicinity of the outer concentric wall of the tank, affords an advantage. Extraction port 50 is advantageous in pressure filling of the tank if this is done via vent line 11. With the filler port 6 (FIG. 1) closed and pressure filling completed, venting can be achieved via extraction port 50, which is connected to the tank venting provisions through connector 8. Any oil which leaks through the extraction port 50 in service, when the oil content is being rotated, will be negligible. With reference especially to FIGS. 1 and 3, it should be added that in the area of the extraction port 50, the tank wall is optionally flared conically towards the extraction port to ensure safe oil extraction even when the oil level in the tank is low.

In a further aspect of the present invention, the tank is rotatably arranged about its longitudinal centerline, so that when it is rotated by external power, its oil content is rotated and essentially central venting of the tank is achieved. For this purpose, vanes are equally spaced in the outer circumferential area of the tank to cause the oil content to rotate. For driving the tank, a small air or gas driven turbine may be provided, with the requisite air or gas being bled from the operating cycle of the jet engine. Alternatively, the tank may be driven, as previously indicated with reference to FIG. 5 by means of an impeller-type pump driven by a stream of oil diverted from the oil circuit or by a stream of oil provided by the return oil as it flows back into the tank, exploiting part of the energy contained in this return oil.

Figure 6:
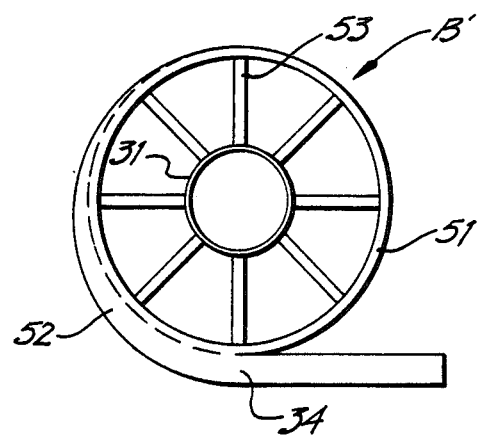
FIG. 6 is a cross-sectional view illustrating a further variant of the tank shown in FIG. 5.

Using the same reference numerals for essentially the same components as in FIG. 5, FIG. 6 illustrates a variant of reservoir B', the difference being chiefly that a circumferentially extending liquid (e.g., oil) extraction duct spirally expanding continuously in the direction of extraction port 34 is integrated into the otherwise concentric wall 51 of the reservoir. Another departure from FIG. 5, is that the various blades 53 in FIG. 6 of the externally driven rotating element are arranged directly on the rotor 31.

The arrangement of the oil extraction duct 52, as here described and illustrated, serves to utilize the externally generated rotational energy of the oil content by conversion into pressure energy, so that the need for a feed oil pump to supply the various units and lubricating points with oil is eliminated.

The embodiments of the liquid reservoirs B, B', in accordance with FIGS. 1, 3, and 5, permit installation in a vertical position. Consequently, the respective longitudinal or rotational axes of the tank and, thus, the respective concentric vent lines 11 or the rotor 31 likewise extend vertically, bearing in mind that with the oil content static, the air extraction port or ports should rise above the oil level in the tank, the invention makes it possible to provide relatively large tank capacity at relatively small tank dimensions.

The invention has been shown and described in preferred form only, and by way of example, and many variations may be made in the invention which will still be comprised within its spirit. It is understood, therefore, that the invention is not limited to any specific form or embodiment except insofar as such limitations are included in the appended claims.

We claim:

1. A reservoir for holding a liquid for use in an aircraft which is subjected to extreme flight attitudes, the reservoir comprising:
    a wall rotationally symmetrical about the longitudinal axis of the reservoir,
    a liquid extraction port located in proximity to said wall,
    means for rotating the liquid content of the reservoir about the longitudinal axis, to provide a central space within the reservoir which is essentially free of liquid, and to maintain the liquid within the reservoir in constant contact with the extraction port, and
    venting means for the reservoir including an air extraction port located along the longitudinal axis of the reservoir and at about the longitudinal center of the reservoir so that when the reservoir is about half full and the liquid in the reservoir is static the air extraction port remains above the liquid level regardless of the orientation of the reservoir.

2. A liquid reservoir as defined in claim 1 including means for returning liquid to the reservoir, and wherein the means for rotating the liquid includes at least one nozzle within the reservoir, arranged substantially tangentially with respect to the rotationally symmetrical well, through which the returning liquid enters the reservoir.

3. A liquid reservoir as defined in claim 2 wherein the nozzle is located directly on the inner surface of the rotationally symmetrical wall.

4. A liquid reservoir as defined in claim 2 including an end wall cooperating with the rotationally symmetrical wall, the nozzle being located on the end wall.

5. A liquid reservoir as defined in claim 2 wherein the nozzle extends from the outside to the inside of the rotationally symmetrical wall.

6. A liquid reservoir as defined in claim 2 including an end wall cooperating with the rotationally symmetrical wall, the end wall being the bottom wall when the reservoir is at rest and its liquid content static, the bottom wall being formed with a conduit forming part of the venting means and being formed with a conduit for transmitting returning liquid to the nozzle.

7. A liquid reservoir as defined in claim 1 wherein the means for rotating the liquid includes a bladed element mounted for rotation substantially along the longitudinal axis of the reservoir, and means for rotating the bladed element.

8. A liquid reservoir as defined in claim 7 wherein the bladed element includes a barrel-shaped rotor within the reservoir fitted close to the interior surface of the rotationally symmetrical wall, the blades of the element extending radially inward toward the axis of rotation of the rotor.

9. A liquid reservoir as defined in claim 8 wherein the blades of the element extend close to the axis of rotation of the rotor.

10. A liquid reservoir as defined in claim 7 including means for returning liquid to the reservoir, the means for rotating the bladed element being propelled by the returning liquid.

11. A liquid reservoir as defined in claim 7 wherein the means for rotating the bladed element includes an impeller-type pump arranged coaxially with the bladed element.

12. A liquid reservoir as defined in claim 11 including a common rotor for the impeller-type pump and the bladed element, the rotor being hollow and communicating with the venting means.

13. A liquid reservoir as defined in claim 12 wherein the common rotor is a tubular body, and including a barrier within the rotor centrally located with respect to the length of the rotor, and ports in the rotor on each side of the barrier, whereby a liquid-air mixture flowing into the rotor is deflected by the barrier out of the rotor through the ports upstream of the barrier, causing the air and liquid to separate, the liquid remaining in the reservoir and the air re-entering the rotor through the ports downstream of the barrier and thereby being vented.

14. A liquid reservoir as defined in claim 1 wherein the venting means includes a rigid tube extending along the longitudinal axis of the reservoir into the space created when the liquid content is rotated the tube having said air extraction port.

15. A liquid reservoir as defined in claim 14 wherein the means for rotating the liquid is a bladed element mounted for rotation on the rigid venting tube.

16. A liquid reservoir as defined in claim 1 including a liquid extraction port for the reservoir located centrally relative to the length of the rotationally symmetrical wall.

17. A liquid reservoir as defined in claim 16 wherein the reservoir wall increases in size toward the liquid extraction port.

18. A liquid reservoir as defined in claim 1 including an end wall cooperating with the rotationally symmetrical wall, the end wall being formed with a conduit forming part of the venting means, and a restrictor port within the end wall between the interior of the reservoir and the venting conduit.

19. A liquid reservoir as defined in claim 18 wherein the end wall is the bottom wall of the reservoir, and the restrictor port communicates directly with the venting conduit.

20. A liquid reservoir as defined in claim 1 in combination with an aircraft turbojet engine, and means for using energy derived from the engine for driving the liquid rotating means.

21. A liquid reservoir as defined in claim 1 wherein the reservoir has a liquid extraction port carried by the rotationally symmetrical wall, the wall increasing in cross-sectional area spirally toward the extraction port.

22. A liquid reservoir as defined in claim 1 including circumferentially equally spaced blades fixed to the rotationally symmetrical wall, the blades extending in the longitudinal direction of the reservoir, to assist the rotation of the liquid content.

* * * * *